Patented July 5, 1949

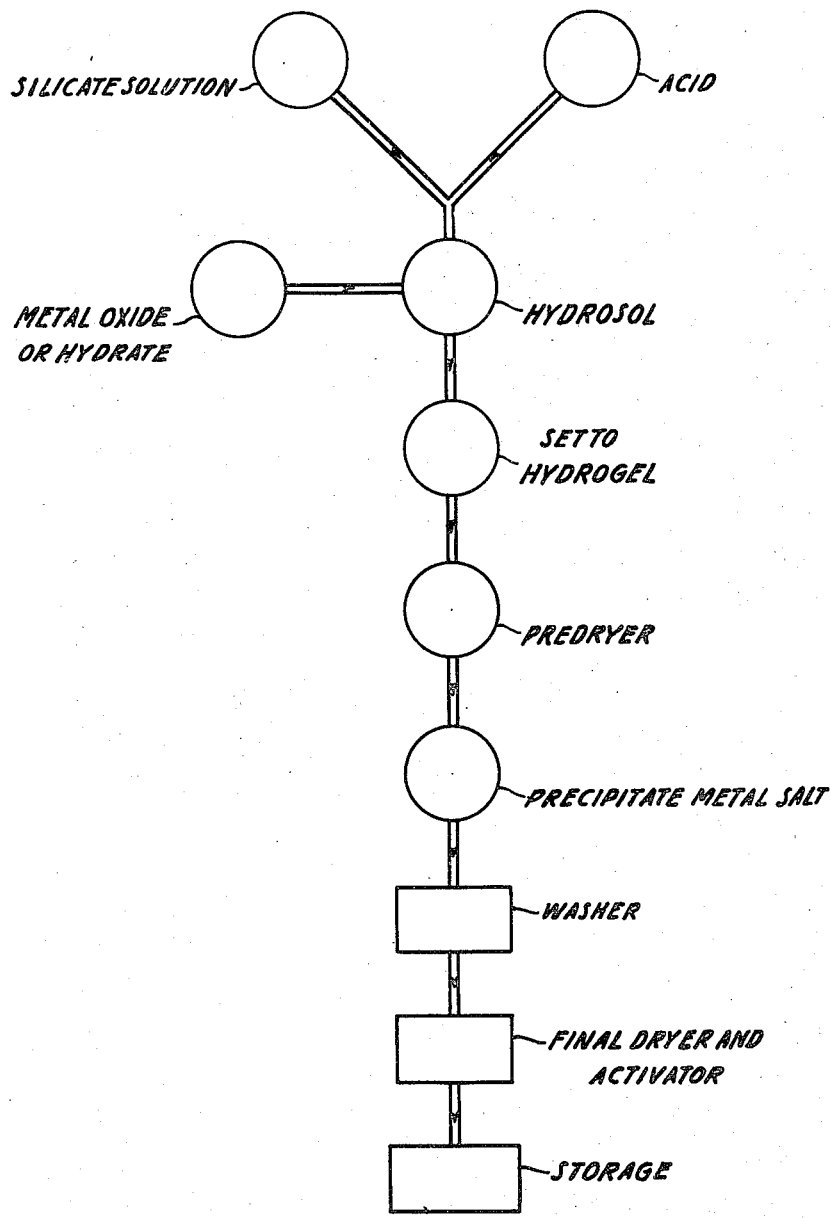

2,474,888

UNITED STATES PATENT OFFICE 2,474,888

PREPARATION OF SILICA-ALUMINA GEL

Gerald C. Connolly, Westfield, N. J., assignor to Standard Oil Development Company, a corporation of Delaware Application December 18, 1943, Serial No. 514,751

4 Claims. (Cl. 252—453)

1

This invention relates to the preparation of synthetic gels and pertains more particularly to the preparation of gels comprising silica and other metal oxides. Such gels are particularly adapted for use as catalysts for the conversion of hydrocarbon oils and the invention in one of its other phases is directed to the conversion of such oils in the presence of a catalyst prepared as hereinafter described.

It has previously been proposed to prepare synthetic gel catalysts containing silica and alumina by first preparing a purified hydrous oxide of silica, such as a silica hydrogel, and thereafter impregnating the purified hydrogel with an aluminum salt followed by the precipitation of hydrous alumina from the salt with a precipitating agent such as ammonium hydroxide. One of the cheapest sources of aluminum salts is aluminum hydrate formed as a by-product in various metallurgical processes. These hydrates can be converted to the corresponding aluminum salt such as aluminum sulfate by treatment with relatively concentrated acid. The aluminum hydrates as such do not form satisfactory catalytic components when incorporated in a silica gel.

One of the principal objects of the present invention is to provide a more simple and inexpensive method of preparing silica-alumina gels.

In my earlier application Serial No. 460,484, now U. S. 2,448,960, filed October 2, 1942, I have described a method of preparing synthetic silica-alumina gels in which the aluminum hydrate, and particularly the trihydrate, is incorporated directly into the silica hydrogel. The hydrate is thereafter converted to the active aluminum oxide while in admixture with the silica by first treating the composite with acid such as sulfuric acid followed by partial drying of the product to effect the reaction between the acid and the aluminum trihydrate. The partially dried product is then treated with a precipitating agent such as ammonium hydroxide to convert the aluminum salt into the corresponding active oxide.

I have now found that a catalyst comprising silica and alumina can be prepared more cheaply and more simply without affecting the catalytic activity by incorporating the aluminum hydrate, and particularly the trihydrate, directly into a silica hydrosol containing a substantial excess of acid sufficient to react subsequently with the aluminum hydrate to form the corresponding aluminum salt. The aluminum trihydrate is preferably added to the silica hydrosol while the sol is maintained at elevated temperature of the order of from 100° to 200° F. Following the incorporation of the aluminum trihydrate into the silica hydrosol the sol is allowed to set until developed into a firm structure. Following this the

2 resulting hydrogel is heated to dry the product partially and to bring about a reaction between the excess sulfuric acid present in the hydrogel and the aluminum hydrate and also to harden the structure. The drying, however, is discontinued prior to removal of all of the moisture from the pores. The partially dried product is then treated with ammonium hydroxide to precipitate the aluminum salt so formed and the precipitated composite is then subjected to washing and final drying.

One of the principal advantages of the method as above outlined is that by preparing the hydrosol with an excess of acid the possibility of forming base exchange zeolitic structures is avoided and a relatively clear hydrosol is insured. Furthermore, the excess acid employed in the preparation of the hydrosol is eventually utilized and reacted with the aluminum hydrate to convert the hydrate into the aluminum salt. Also by predrying the product while the product remains acid the washing is simplified since the volume of gel being washed is greatly reduced, and any sodium impurities contained in the aluminum hydrate are immediately converted to the easily washable sodium sulfate salts.

The invention will be better understood by reference to the accompanying drawing which is a flow sheet illustrating schematically the various steps making up my invention.

Referring to the drawing, the sodium silicate solution and acid are first combined with thorough agitation to form a clear hydrosol and sufficient excess acid is employed to react subsequently with aluminum hydrate to deposit a sufficient amount of alumina on the final product. For the conversion of oils the amount of alumina so deposited may range from 10% to 20% and preferably between 12% and 15%. The hydrosol containing the excess acid is then heated to a temperature of from 100° to 200° F., preferably 150° F., and the aluminum hydrate in the form of a trihydrate is directly added to the sol in a quantity sufficient to form a desired amount of alumina on the final catalytic product, or the aluminum hydrate may be added to the sol and then brought up to the setting temperature while stirring vigorously enough to keep the aluminum hydrate in uniform distribution. Following the addition of the aluminum hydrate the hydrosol is then permitted to set until syneresis is fully developed. Following this the hydrogel is subjected to a preliminary drying to about 50% of the water content at temperatures below the boiling point of water. This increases the concentration of the sulfuric acid and causes the reaction between the acid and the aluminum hydrate to form the corresponding aluminum salt. Following this, the partially dried hydrogel is treated or soaked in an ammonium hydroxide solution. The amount of ammonium hydroxide used should preferably be somewhat less than that required to precipitate completely the alumina from the aluminum salt. However, in some cases the theoretical quantity of ammonium hydroxide may be employed. The addition of the ammonium hydroxide causes the precipitation of hydrous alumina on and throughout the silica gel. Following this the silica-alumina composite is subjected to thorough washing treatment to remove all of the reaction impurities such as any sodium or other alkali metals which may be contained in the initial materials. By subjecting the hydrogel to partial drying before the washing treatment the bulk or volume of material may be reduced to about one-sixth of its original volume before the first drying treatment.

Following the washing treatment the product is given the final drying treatment and may thereafter be heated to an elevated temperature of from 600° F. to the temperature at which the product is to be used. The resulting product may then be utilized as such or it may be ground into powder or molded into pills of predetermined size.

The following example may be helpful to a better understanding of the invention, it being understood that the conditions given are illustrative rather than limitative.

*Example*

A silica hydrosol was first prepared by reacting 10 volumes of 25° Bé. sodium silicate solution with 6 volumes of sulfuric acid containing about 175 cc. of concentrated acid per liter of solution. By thorough agitation during the mixture, a clear hydrosol was formed. This product was heated to 150° F. and while heating with stirring 36 gms. of powdered commercial iron-free aluminum hydrate per liter of sol was added, or sufficient aluminum hydrate was added to form a product containing about 12.5% alumina. This product was allowed to set and then heated to about 50% of the moisture. The resulting product was then treated with an ammonium hydroxide solution containing sufficient ammonium hydroxide to react completely with the aluminum sulfate. The product was then thoroughly washed and subjected to final drying.

The activity of this catalyst was determined by passing an East Texas gas oil of 33.8° A. P. I. gravity through a tube containing the catalyst in molded form at a velocity of 0.6 volume of liquid feed per volume of catalyst per hour and the reaction tube was maintained at a temperature of 850° F. with a cracking period of two hours. Under the above conditions it was found that the amount of gasoline formed from the gas oil amounted to about 55.0 volume per cent.

The method has been outlined embracing the manufacture of silica-alumina gels. However, the method with slight modifications is applicable to composite gels such as, for example, silica-magnesia, silica-zirconia, silica-thoria, silica beryllia, and the like, or three or more component catalysts such as silica-alumina-magnesia, silica-alumina-beryllia, silica-alumina-zirconia, silica-magnesia-zirconia, silica-magnesia-beryllia, silica-zirconia-beryllia, or other mixtures of these components. These additional components may be introduced into the hydrosol in the form of hydrates, oxides, carbonates and the like. Furthermore, the catalyst may be used for other hydrocarbon conversion processes such as dehydrogenation, reforming, isomerization, polymerization, hydrogenation, or other reactions using catalysts having silica gel as a base.

Having described the preferred embodiment of the invention, it will be understood that it embraces such other variations and modifications as come within the spirit and scope thereof.

I claim:

1. A method of preparing a synthetic gel containing silica and alumina which comprises forming a silica hydrosol containing a substantial excess of acid, adding aluminum hydrate to said sol in an amount sufficient to completely react with said excess acid, thereafter converting said sol to a hydrogel, partially drying said hydrogel to cause said acid to react with said aluminum hydrate and form an aluminum salt of said acid, thereafter treating said gel with ammonium hydroxide to convert said aluminum salt into alumina and washing and drying the resulting product.

2. A method of preparing a synthetic gel containing silica and alumina which comprises reacting an alkali silicate with a substantial excess of acid to form a silica hydrosol, adding an aluminum hydrate to the hydrosol so formed in an amount sufficient to completely react with said excess acid, thereafter converting said hydrosol into a hydrogel, partially drying said hydrogel to cause said excess acid to react with said aluminum hydrate to form the aluminum salt of said acid, thereafter treating said gel with ammonium hydroxide to convert said aluminum salt to alumina, subsequently washing the resulting product substantially free of reaction impurities and drying the resulting product.

3. In the process defined by claim 2, the further improvement wherein the partial drying is sufficient to remove at least 50% of the water contained therein.

4. A method of preparing a synthetic gel consisting of silica and alumina which comprises reacting about 10 volumes of 25° Bé. sodium silicate solution with about 6 volumes of sulfuric acid containing about 175 cc. of concentrated acid per liter of solution to form a clear hydrosol containing an excess of acid, heating the resulting sol to a temperature of 150° F. while adding sufficient dried aluminum hydrate to said sol to form a final product containing about 12.5% alumina, causing said hydrosol to set into a hydrogel, partially drying said hydrogel to about 50% of the moisture therefrom, treating the resulting product with an ammonium hydroxide solution to react completely with the aluminum sulfate formed during the drying treatment, thereafter thoroughly washing the resulting product to remove reaction impurities and drying the resulting product.

GERALD C. CONNOLLY.

REFERENCES CITED

The following references are of record in the file of this patent:

UNITED STATES PATENTS

| Number | Name | Date |
|---|---|---|
| 1,755,496 | Behrman | Apr. 22, 1930 |
| 2,229,353 | Thomas | Jan. 21, 1941 |
| 2,340,934 | Connolly | Feb. 8, 1944 |
| 2,340,935 | Connolly | Feb. 8, 1944 |

OTHER REFERENCES

Mellor, "Mod. Inorg. Chem.," (1939), page 669.